July 16, 1968  F. A. SIMMONS  3,392,479
INSECT FOGGER WITH FIRE PREVENTION SAFETY MEANS
Filed July 28, 1966  2 Sheets-Sheet 1
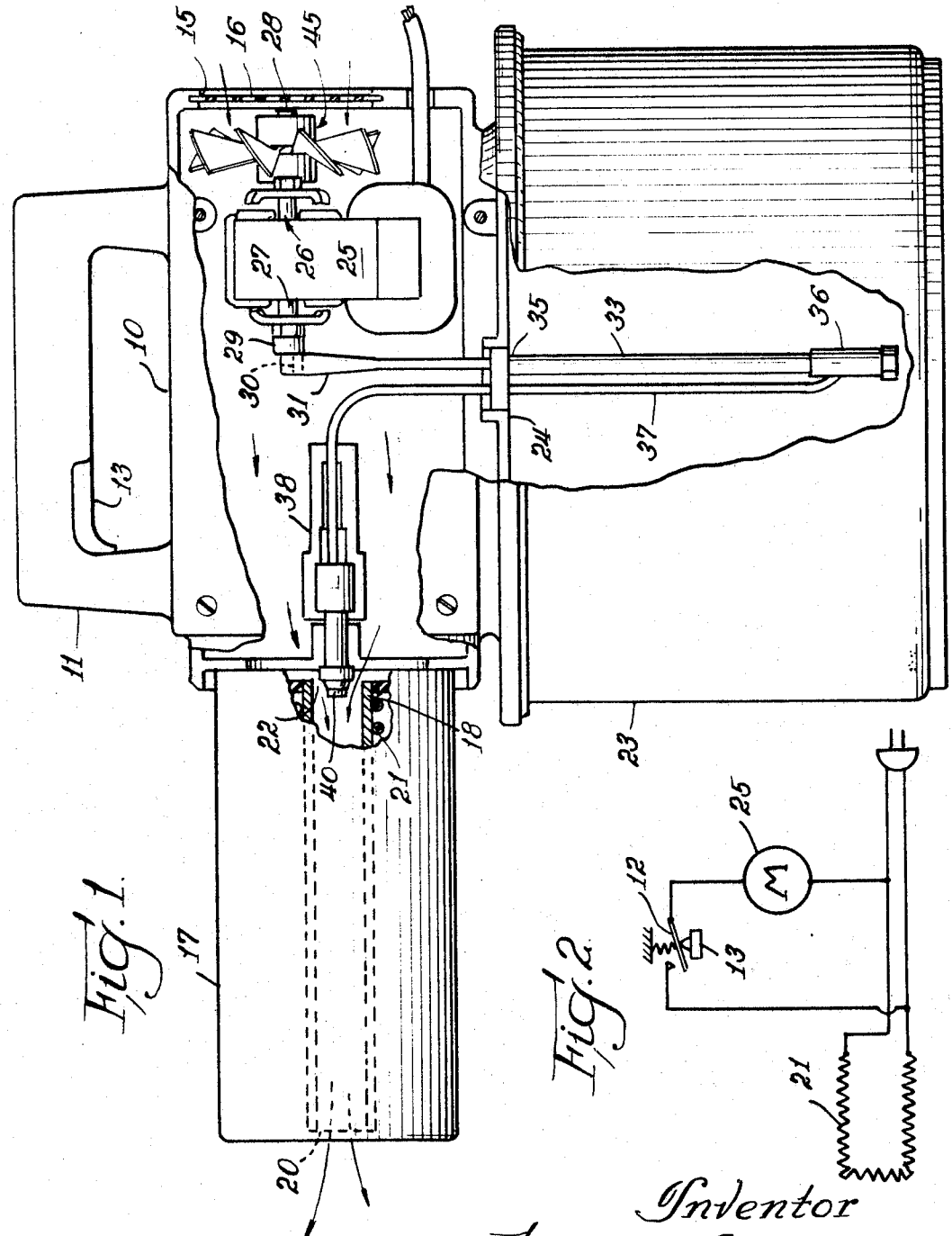
Inventor
Frank A. Simmons
By
Darbo, Robertson & Vandenburgh
Att'ys.

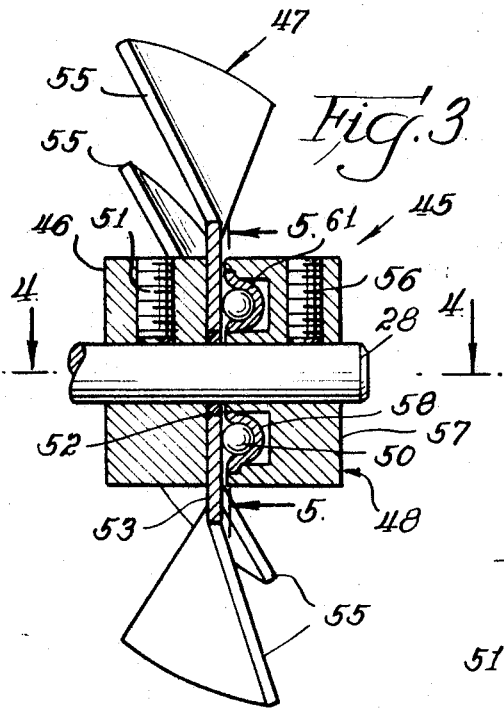
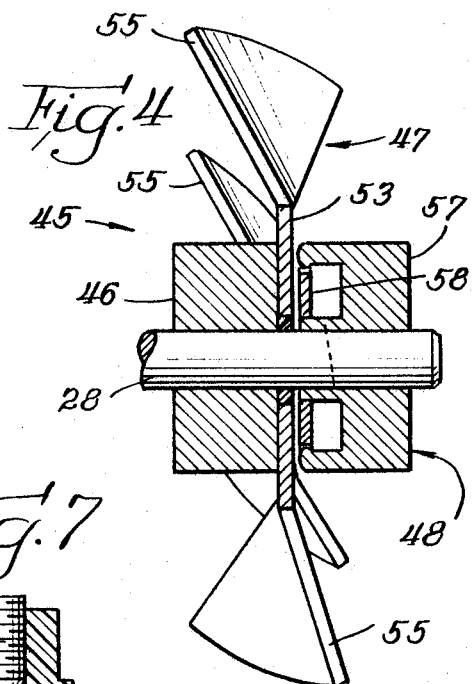
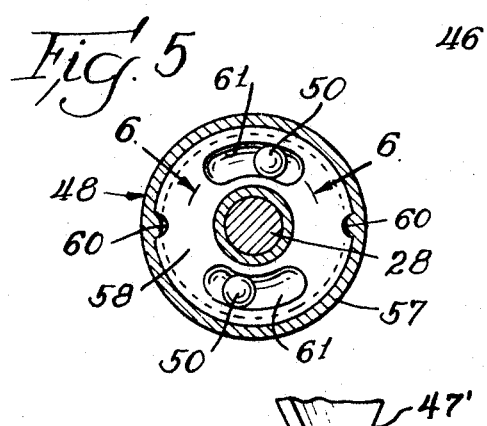
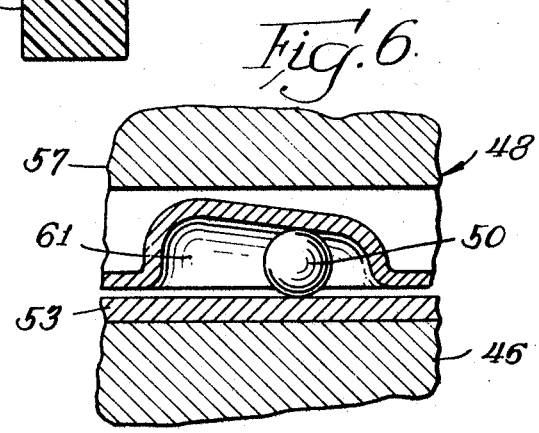
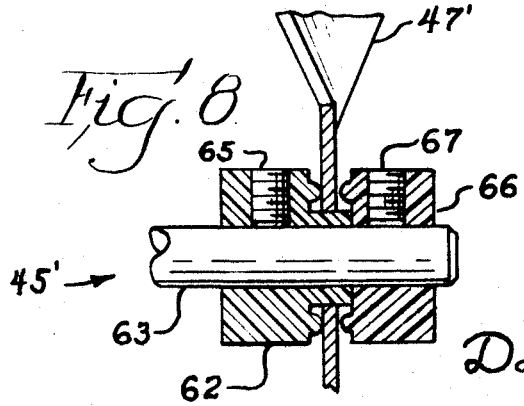

United States Patent Office 3,392,479
Patented July 16, 1968

3,392,479
INSECT FOGGER WITH FIRE PREVENTION
SAFETY MEANS
Frank A. Simmons, Lake Zurich, Ill., assignor to Burgess Vibrocrafters, Inc., Grayslake, Ill., a corporation of Delaware
Filed July 28, 1966, Ser. No. 568,476
5 Claims. (Cl. 43—129)

This invention relates to insect fogging apparatus, and more particularly to means for avoiding fires in insect foggers which utilize the principle of spraying liquid insecticide solutions through a heated chamber or duct to create an insect repelling and/or killing fog.

Apparatus of this type is currently in wide use, and is principally used out of doors to rid an area of insect pests such as mosquitoes, flies, ticks, etc. The apparatus is usually contained in a single package and is powered either by a standard source of electrical power or a self-contained prime mover such as an engine. In operation, the apparatus pumps liquid insecticide (i.e., the active insecticide dissolved in a suitable carrier solvent) through a nozzle, forming a spray, and from there into and through a heated duct or chamber to convert the insecticide spray into a fog. This fog is emitted out of the end of the duct, and the operator of the apparatus can then manually direct the fog at or into shrubbery, grass, or the like.

One significant problem experienced with such apparatus is caused by the interrelation of the insecticide's temperature of combustion and the heated duct which by necessity must be kept at a relatively high temperature in order to convert the liquid spray into a desirable fog. One method of producing fog is by blowing fresh air with the spray through the heated duct. However, this cooling air flow ceases when the fogger is turned off, and the last remnants of insecticide ejected from the nozzle are therefore not carried out of the heated duct. Inasmuch as neither the heated duct nor its contents is any longer cooled by this fresh air current, the residual insecticide retained therein may reach its temperature of combustion and actually ignite. If the fogger is again turned on while this residual insecticide is burning, the fogger may belch forth flames in a manner similar to a flame thrower.

As will be seen, this invention is concerned with preventing the fire hazard incident to the use of such a fogger.

It is a general object of this invention to provide an insect fogger of the type described with means for preventing residual amounts of insecticide from igniting a fog stream in its heated chamber or duct.

In accomplishing this object, the invention features a fan or blower which continues to force fresh air through the heated duct after the spray portion of the fogger has been turned off, thereby assuring the complete elimination of insecticide without special attention by the operator. In the preferred embodiment, this blower is attached to the fogger's source of power by means of a one-way or overriding clutch. This causes the blower to be driven forwardly upon turning the fogger on for operation, and also permits it to continue rotating for a short while after turning off the fogger. Alternatively, the blower wheel is mounted as an idler, fully free wheeling, to be driven in rotation by the stream of air drawn through the fogger by the aspirating effect of the spray jet.

Other objects, advantages, and features will become readily apparent upon a reading of the following description when taken in conjunction with the accompanying drawings, wherein:

FIG. 1 is a side elevation, with portions broken away, of a conventional form of fogger chosen to illustrate the principles of the present invention which is embodied therein;

FIG. 2 is a schematic wiring diagram for the fogger shown in FIG. 1;

FIG. 3 is a cross-sectional and enlarged view of the blower assembly shown in FIG. 1;

FIG. 4 is a cross-sectional view of the blower assembly taken generally along the lines 4—4 of FIG. 3;

FIG. 5 is a cross-sectional view of the blower assembly taken generally along the lines 5—5 of FIG. 3, and shows the clutch plate and hub assembly;

FIG. 6 is a detailed view, in cross section, of the blower assembly taken generally along the lines 6—6 of FIG. 5;

FIG. 7 shows a modified form of retaining hub used in the blower assembly, and

FIG. 8 shows a modified form of blower assembly in cross section, this modified form being mounted in an entirely free wheeling manner and not incorporating a clutch.

Referring now to the drawings in more detail, and with particular reference to FIGS. 1 and 2, the fogger includes a housing 10 having a carrying handle 11 attached thereto. Within handle 11 is mounted an electrical switch 12 held open by a spring biased push button 13, the rear end of the housing has an opening 15 therein to permit the admission of fresh air, and this opening is shown protectively covered by means of a grill 16.

Extending forwardly from the front end of housing 10 is an outer cylindrical shield 17 which entirely surrounds an inner cylindrical tube or duct 18. Tube 18 is open to the atmosphere at its forward end 20. A heating element 21 surrounds tube 18. Rear end 22 of the tube 18 is open to the inside of housing 10 to thereby provide a path for the flow of fresh air through grill 16, housing 10, and tube 18, as illustrated generally by the flow arrows in FIG. 1.

Connected to the bottom of housing 10 is a fluid insecticide reservoir 23. A filler cap, not shown, is provided in the top surface of reservoir 23 to facilitate its being filled with liquid insecticide, and a cover plate 24 separates the enclosure formed by housing 10 from reservoir 23.

Carried inside housing 10 is an electric motor 25 connected electrically in parallel with heating element 21. Motor 25 has a driven shaft 26 extending therethrough which includes front end 27 and a rear end 28. Front end 27 of the motor shaft rigidly carries an eccentric drive 29 thereon which includes an offset, forwardly extending pin 30. As will be understood, pin 30 revolves in a circular path.

Journaled on pin 30, and extending downwardly therefrom, is an elongate, slim push rod 31 of a relatively flexible material such as nylon. Push rod 31 extends through a hole provided therefore in the cover plate 24, and from there downwardly through a tube 33 rigidly connected to cover plate 24 at its upper end 35. Although the portion of push rod 31 above cover plate 24 bends significantly from side to side as caused by the rotary movement of pin 30, its lower portion reciprocates within tube 33. Attached to the lower end of tube 33 is a pump fitting 36 which would normally be below the level of the liquid insecticide within reservoir 23. Reciprocating movement of the lower end of push rod 31 draws the liquid insecticide into the pump and forces it therefrom through a tube 37. Tube 37 extends upwardly through cover plate 24 to a nozzle assembly 38. The forward end 40 of the nozzle assembly 38 is positioned in the rear end 22 of inner heating tube 18, and it contains an orifice though which the liquid insecticide is sprayed axially into the tube.

Rear end 28 of the motor shaft carries a fan or blower assembly shown generally at 45. Blower assembly 45 exemplifies one preferred manner of achieving the object of the present invention, and will be described next.

Referring now to FIGS. 3–7, blower assembly 45 includes a retaining hub 46, a fan or blower 47, a clutch plate and hub assembly 48, and a pair of balls 50.

Retaining hub 46 is of generally cylindrical shape and has an axially aligned hole therethrough of generally the same size as shaft 28 on which it is mounted and rigidly secured by means of a set screw 51. Carried on shaft 28 immediately behind retaining hub 46 is an anti-friction bushing 52 of smaller outer diameter than retaining hub 46. In an alternate form, as shown in FIG. 7, retaining hub 46 and bushing 52 may be formed as an integral piece 46' of anti-friction material such as nylon.

Fan 47 includes a central disc shaped hub 53 having a central hole therethrough of generally the same diameter as the outer diameter of bushing 52. Fan 47 is slidably mounted over bushing 52 so that it may rotate relative to retaining hub 46. Fan 47 also includes a plurality of outwardly extending and similarly pitched blades 55.

Clutch plate and hub assembly 48 is of cylindrical shape with an axial hole therethrough of the same diameter as motor shaft end 27 on which it is rigidly mounted by means of set screw 56. Assembly 48 lies immediately behind fan 47 and includes a hub 57 and a clutch plate 58. Clutch plate 58 is mounted in the front face of hub 57 and has a pair of notches 60 in its outer periphery to permit a staking operation which rigidly connects hub 57 and clutch plate 58.

Clutch plate 58 has formed therein a diametrically opposed pair of arcuately curved indentations 61 of varying depth, this varying depth being best seen in FIG. 6. It will be understood that the deeper ends of both indentations 61 are diametrically opposed to each side of the motor shaft, and similarly, the shallower ends are also diametrically opposed relative to the motor shaft. Indentations 61 open forwardly toward the fan hub 53, and each indentation 61 carries a ball 50. The size of each ball 50 is such that it is loosely carried in the indentation 61 when it is disposed in the deeper end of the indentation, but engages both the back wall of indentation 61 and the fan hub 53 when disposed in the shallow end of indentation 61. It will be noted that the transition between the deep and shallow ends of indentation 61 is relatively gradual so as to cause a wedging action of the ball when it moves toward the shallow end.

In describing the operation of the invention, it will be remembered that the specific form of the fogger and its source of power are not its important features. Rather, the invention concerns itself with eliminating a fire hazard.

In operation, and assuming the illustrated fogger is connected to a source of electrical energy and reservoir 23 contains liquid insecticide, the operator permits the heating element to heat tube 18 to insecticide-vaporizing temperature. He then closes switch 12 by means of push button 13 to start the motor 25. The motor drives both blower assembly 45 and push pump rod 31. The pump forces fluid through tube 37 to nozzle assembly 38. Insecticide is sprayed forwardly out of the front end 40 of nozzle assembly 38 and into tube 18 where it is heated to form a fog.

Fresh air is drawn into housing 10 through the opening 15 at the rear thereof in part by means of the aspirating effect created by the forwardly sprayed fluid. Augmenting this aspiration of air, blower assembly 45 positively forces the air forwardly through tube 18 inasmuch as it is constrained to rotate forwardly with motor shaft 28 by virtue of its clutch arrangement. More specifically, the direction of rotation of the motor is such that balls 50 are driven to their wedging position in the shallow portion of indentation 61 (substantially as shown in FIGS. 5 and 6) immediately after starting the motor 25. This is because the inertia of fan 47 initially prevents it from rotating with the direct motor driven clutch plate and hub assembly 48. As a result, a relative rotation is set up between these parts which in turn rolls the balls 50 into their wedging position. With balls 50 in this position, blower assembly 45 is constrained to rotate as a unit. This action occurs almost immediately upon starting motor 25 so that the fan begins rotating substantially simultaneously therewith.

The fresh air drawn into housing 10, as caused by both the aspirating effect and the fan 47, is forced through tube 18 around nozzle assembly 38 where it mixes with the insecticide spray. The resulting fog is blown out forwardly from the front opening 20 of tube 18 in a stream that can be directed as desired by the operator.

Upon releasing push button 13, motor 25 stops operating and the spraying of insecticide is discontinued. If fan 47 were to stop with motor 25, which would be the case if it were rigidly connected to the motor shaft, the last portion of insecticide ejected from nozzle assembly 38 would remain inside of the heated tube 18. With the supply of air discontinued, the insecticide left in the hot tube may smolder and actually ignite, and if the fogger is once again turned on while this insecticide is burning, flames rather than fog may be emitted from the fogger with serious fire damage or injury resulting.

However, by incorporating the one way clutch in the blower assembly 45, these residual amounts of insecticide are bolwn out of tube or duct 18 and thus fire in the tube is avoided. Specifically, the rotational inertia of fan 47 causes it to continue to rotate at the same speed while shaft end 27 begins to slow down. This results in a relative rotation between clutch plate 58 and fan hub 53 which is oppposite to the relative rotation resulting when motor 25 is started. As a result, balls 50 are rolled into the deep end of their respective indentations 61 so as to come out of their wedging positions. Thus, the balls 50 rest in the deep end of indentations 61 and the fan 47 is free to rotate independently of shaft 27. The angular inertia of fan 47 causes it to continue rotating for a short while which is sufficient to blow the residue of insecticide from tube 18. Thus, the insecticide is removed from the heating chamber before its temperature is raised above its temperature of combustion, and fire is avoided.

Referring now to the modified arrangement shown in FIG. 8, the blower assembly (here shown as 45') includes a combination hub and bushing 62 similar in form to retaining hub 46'. Combination hub and bearing 62 is fixed to a shaft 63 by means of a set screw 65, and it rotatably carries thereon a fan 47' similar to fan 47 of the first described embodiment. Fan 47 is retained on combination hub and bearing 62 by means of a retaining hub 66 also carried by shaft 63 and secured thereto by means of a set screw 67.

Shaft 63 is preferably a motor shaft such as shown at 28 in the earlier described embodiment, or it may be a shaft having no connection with the motor whatsoever. In either event, blower assembly 45' is mounted on the shaft 63 in an entirely free wheeling manner, i.e., as an idler, and it is positioned in the path of air being drawn into inner tube 18.

The aspiration of air through tube 18, as caused by the forwardly sprayed fluid, passes over the pitched blades 55' of fan 47' and causes the fan to rotate. Upon turning off the spray, fan 47' continues to free wheel for a short time due to its momentum and air flushes the heated duct in a manner similar to that discussed above relating to the first described embodiment.

When the fan 47' is mounted on a shaft connected to a motor such as that shown at 25 in FIG. 1, the small amount of friction between the fan hub and bearing 62 is not undesirable, since rotation of the fan is contemplated.

It will be understood that mechanical arrangements differing from that herein shown and described by way of example may be employed to achieve the same objective, and the invention is not intended to be limited to the form of this particular example, but only by the definitions of the claims appended hereto.

Invention is claimed as follows:

1. In a fogger having a heated duct and including a motor and sprayer means driven thereby for spraying insecticide into said duct, blower means for continuously supplying air to said duct along with the insecticide while the sprayer means is operating, and means for automatically air-flushing said duct for a limited period of time upon discontinuance of the spray stream thereinto to remove substantially all insecticide therefrom wherefor to avoid fire therein.

2. Structure in accordance with claim 1 wherein the blower means includes a rotatable bladed element operatively connected with the motor to drive air through the heated duct while said motor is operating, and the means for air-flushing the duct including an overriding clutch arranged as a part of the connection between said bladed element and said motor whereby to permit free wheeling continued effective rotation of said bladed element for a limited period of time after said motor and sprayer are stopped.

3. In a fogger wherein a liquid insecticide is sprayed through a heated chamber to create a fog, means for removing residual amounts of said insecticide from said chamber upon discontinuance of the spray, comprising: blower means forming a part of said fogger for stripping residual insecticide from said chamber, and means for causing said blower means to operate after the spraying has ceased to blow said residual insecticide out of said chamber.

4. Structure in accordance with claim 3 wherein said blower means comprises a rotatable bladed element arranged to drive fresh air through said heated duct, said bladed element gaining rotational inertia as said liquid insecticide is sprayed, and wherein said last mentioned means comprises mounting means for said bladed element for permitting the free wheeling thereof after termination of said spraying to thereby drive air through said chamber and strip residual insecticide therefrom.

5. In a fogger having a heated duct through which a liquid insecticide is sprayed forwardly, said spray creating an aspiration of air into said tube which mixes with the heated spray to form a fog, means for air flushing said duct immediately upon discontinuance of the spraying, comprising: a shaft mounted in said fogger; a bladed fan element; and means rotatably mounting said fan element freely on said shaft in the path of said aspirated air for causing said fan element to rotate as a result thereof during said spraying and for permitting said fan element to free wheel for a short period after discontinuance of said spraying due to its own momentum whereby additional air is moved through said heated duct and removes residual insecticide contained therein.

References Cited

UNITED STATES PATENTS

| | | | |
|---|---|---|---|
| 1,881,569 | 10/1932 | Hermann | 239—351 |
| 2,201,995 | 5/1940 | Erickson | 43—125 |
| 2,807,319 | 9/1957 | Witherell | 239—351 |
| 3,074,199 | 1/1963 | Johnson | 239—136 |
| 3,104,820 | 9/1963 | Lugo | 239—138 |
| 3,244,641 | 4/1966 | Durr et al. | 43—129 X |
| 3,250,723 | 5/1966 | Fortney | 252—305 |
| 3,255,967 | 6/1966 | Kenney | 43—125 X |

ALDRICH F. MEDBERRY, *Primary Examiner.*